(12) United States Patent
Shih

(10) Patent No.: US 7,369,958 B1
(45) Date of Patent: May 6, 2008

(54) SYSTEM AND METHOD FOR SETTING MOTHERBOARD TESTING PROCEDURES

(75) Inventor: Wen-Hsin Shih, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 11/708,277

(22) Filed: Feb. 19, 2007

(51) Int. Cl.
*G06F 19/00* (2006.01)

(52) U.S. Cl. ...................................... 702/118; 702/119

(58) Field of Classification Search ................ 702/118, 702/119, 123; 714/42, 46, 47; 324/765; 713/2
See application file for complete search history.

(56) References Cited

U.S. PATENT DOCUMENTS

| | | | | |
|---|---|---|---|---|
| 5,644,705 | A * | 7/1997 | Stanley | 714/42 |
| 7,213,139 | B2 * | 5/2007 | Zhang | 713/1 |
| 2002/0183955 | A1 * | 12/2002 | Adler | 702/117 |
| 2005/0057272 | A1 * | 3/2005 | Park et al. | 324/765 |

* cited by examiner

*Primary Examiner*—Bryan Bui
(74) *Attorney, Agent, or Firm*—Peter F. Corless; Steven M. Jensen; Edwards Angell Palmer & Dodge LLP

(57) ABSTRACT

The present invention discloses system and method for setting motherboard testing procedures. The method includes the steps of: selecting the required testing mode numeral corresponding to one of a plurality of BIOS programs, which required a next testing station via a setting module and storing the same into a second storage module as a preset testing mode numeral; performing a start-up procedure by the system; reading the preset testing mode numeral in the second storage module via a reading module during the start-up phase, and loading the BIOS program corresponding to the testing mode numeral into the system to perform subsequent test according to the loaded BIOS program. Thus, different testing modes can be set according to different testing stations, thereby increasing testing efficiency of motherboard testing procedures having a plurality of testing stations.

6 Claims, 2 Drawing Sheets

SYSTEM AND METHOD FOR SETTING MOTHERBOARD TESTING PROCEDURES

BACKGROUND OF THE INVENTION

1. Field of the Invention

The present invention relates generally to motherboard testing procedure setting systems, and more particularly, to a system and method for setting motherboard testing procedures having a plurality of testing stations.

2. Description of Related Art

With greatly improved integration of circuit boards and electronic components, much more functionalities are being provided by computer motherboards. A motherboard is one of important components in a computer device, and the other important component, such as a central process unit (CPU), bus, memory, connecting port, storage unit and data input/output unit connected with the connecting port can be disposed on the motherboard. Further, these components are integrated by the motherboard so as to perform data processing works according to instructions.

To ensure these components are successfully disposed on the motherboard and work properly normally, the motherboard needs to pass through a variety of testing stations at different stages such that special functionalities of the motherboard can be respectively tested through different the testing stations. For example, some of the testing stations are used to test whether random access memories disposed on the motherboards work normally; some of the testing stations are used to test whether peripheral device connecting ports of the motherboard work properly; and some of the testing stations are used to test whether built-in display driver work properly.

However, testing contents of motherboards required by manufacturers can be different from those required by end users. For example, motherboard-testing procedures of manufacturers do not need to test all memory blocks, which instead only need to test beginning blocks or some part of the blocks for increasing the testing speed. Also, some testing modes are only needed by end users but are not needed by manufacturers. Accordingly, these testing modes can be skipped or concealed in testing procedures of manufacturers so as to increase the testing efficiency. In simple words, depending on different users, contents of the motherboard testing modes can be varied.

Conventional motherboard testing systems are generally combined with the BIOS and executed by the BIOS during the start-up phase. To meet demands for testing modes of manufacturers, a jumper is disposed on the motherboard such that the BIOS can execute the motherboard testing procedures required by the manufacturers during the start-up phase when the jumper is connected.

Although the above-described testing method can efficiently perform the testing procedures required by manufacturers, it has some limitations. For example, different testing modes may contain a lot of testing options performed by different testing stations in motherboard testing procedures of manufacturers. Therefore, setting the testing mode only through a jumper has limitation. Especially if the testing stations are over two, over two jumpers need to be disposed on the motherboard, which is costly and space-consuming. Moreover, different testing stations of manufacturers cannot perform the test only according to the main testing options needed by the present testing stations. Instead, they have to perform some unnecessary testing options belonging to other testing stations, thereby adversely affecting the motherboard testing efficiency.

Therefore, there is a need to develop a system and method for setting motherboard testing procedures that can set different testing modes and testing options according to different motherboard testing stations, thereby saving testing time of each testing station and increasing motherboard testing efficiency.

SUMMARY OF THE INVENTION

According to the above drawbacks, an objective of the present invention is to provide a system and method for setting motherboard testing procedures that can set different testing modes and testing options according to different motherboard testing stations, thereby increasing testing efficiency of the motherboard testing procedures having a plurality of testing stations.

In order to attain the above and other objectives, the present invention provides a system for setting motherboard testing procedures which is applicable in a plurality of testing stations. The system includes a first storage module stored with a plurality of BIOS programs respectively corresponding to the testing stations; a second storage module stored with a plurality of testing mode numerals corresponding to the BIOS programs; a setting module for setting a required testing mode corresponding to one of BIOS programs, which required by one of the testing stations and storing the required testing mode numerals into the second storage module; a reading module for reading the testing mode numeral from the second storage module; and a loading module for loading one of the BIOS programs from the first storage module, which corresponding to the testing mode numeral stored in the second storage and read by the reading module.

The present invention also discloses a method for setting motherboard testing procedures using the above-described system. The method includes the steps of: setting a required testing mode numeral corresponding to one of the BIOS programs, which required by a next testing station via the setting module and storing the same into the second storage module as a set testing mode numeral; performing a start-up procedure by the system; reading the set testing mode numeral from the second storage module by the reading module during the performance of the start-up procedure; loading the BIOS program corresponding to the testing mode numeral from the first storage module to the system by the loading module; and executing the BIOS program by the system so as to perform corresponding testing works.

Therefore, through relative operations between the storage modules, the setting module, the reading module and the loading module, the system and method for setting motherboard testing procedures according to the present invention can set different testing modes and testing options according to different testing stations, thus improving the testing efficiency of the motherboard testing procedures having a plurality of testing stations.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be made without departing from the spirit of the present invention.

Figure 1:
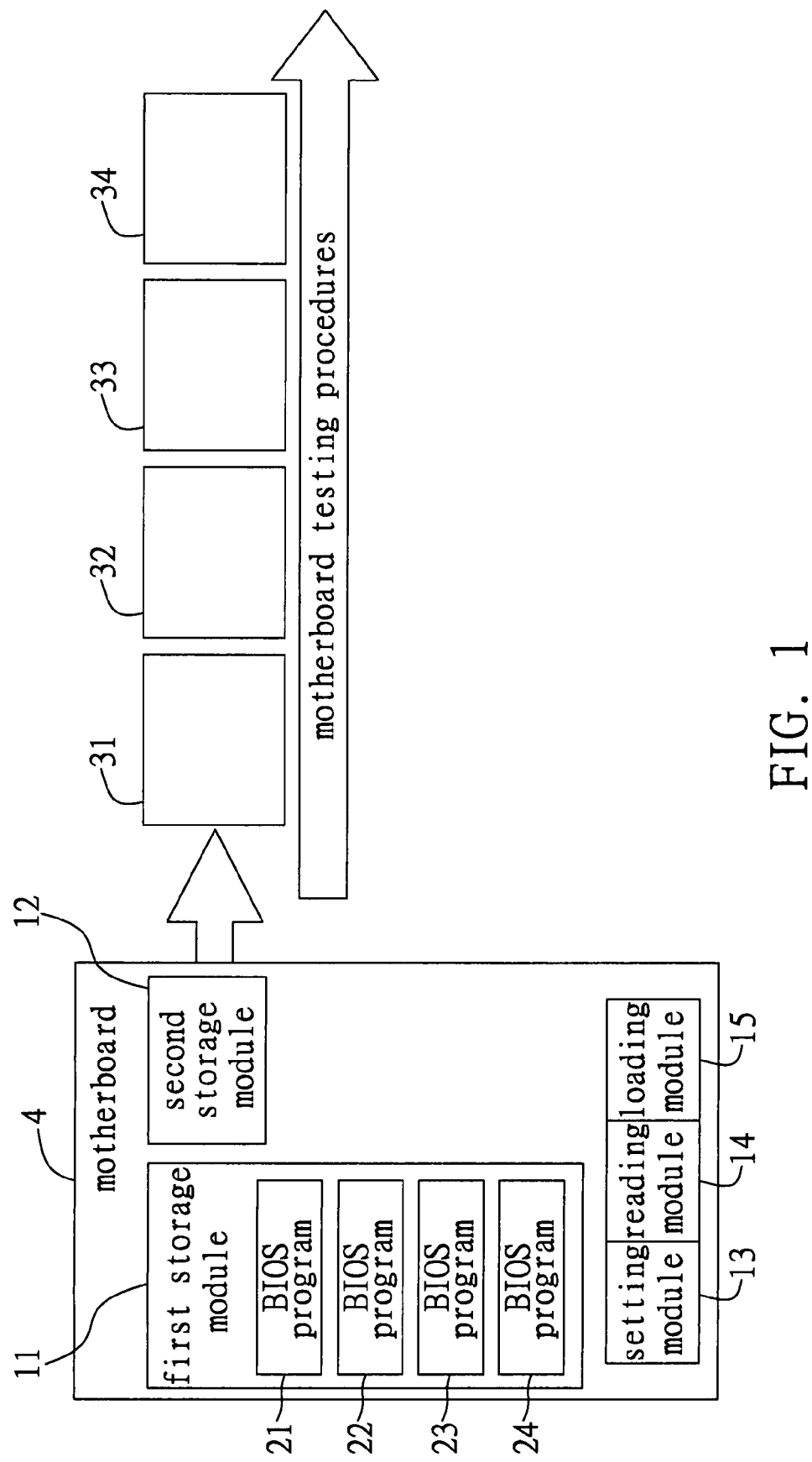
FIG. 1 is a diagram showing a basic structure of a system for setting motherboard testing procedures according to the present invention.

FIG. 1 shows a basic structure of a system 1 for setting motherboard testing procedures according to the present invention which is applied in motherboard testing procedures which is applicable in at least one testing station. In the present embodiment, the system 1 comprises a first storage module 11, a second storage module 12, a setting module 13, a reading module 14 and a loading module 15.

The first storage module 11 and the second storage module 12 are disposed on a motherboard 4. The first storage module 11 is stored with four BIOS programs 21 to 24 required by a first, second, third and fourth testing station 31 to 34. Practically, the first storage module 11 is further stored with BIOS main programs different BIOS subprograms. The BIOS main programs are required by all of the testing station 31 to 34, and the BIOS subprograms are adjustable according to the requirement of the testing stations 31 to 34 so as to reduce the storage space. It should be noted that although the present embodiment exemplifies four BIOS programs 21 to 24, it is not limited thereto. In the present embodiment, the first storage module 11 is a non-volatile memory such as an EPROM, an EEPROM or a flash memory. The BIOS programs 21 to 24 can initialize memories, motherboard chipsets, display cards and peripheral devices, and resident interrupting programs called by operation systems and application programs.

In the present embodiment, testing modes executed by the BIOS programs 21 to 24 can test CPUs, buses, memories, connecting ports, storage units and data input/output units connected with the connecting ports. Preferably, the testing modes can further comprise at least one testing option, which is a detailed testing item corresponding to the testing mode of a component, such as processing speed of a CPU, rotating speed of a CPU fan, whether all or part of the blocks of a memory is normal, whether a connecting port is normally connected with peripheral devices, data transferring rate of a connecting port, etc.

The second storage module 12 is stored with a plurality of testing mode numerals respectively corresponding to the BIOS programs 21 to 24. The second storage module 12 is a non-volatile memory, such as an EPROM, an EEPROM or a flash memory.

The setting module 13 is used to set a required testing mode numeral corresponding to one of the BIOS programs 21 to 24, which is required by one of the first to fourth testing stations 31 to 34 of the motherboard testing procedures and store the required testing mode numeral into the second storage module 12. In the present embodiment, the setting module 13 selects a testing mode numeral corresponding to the BIOS program 21 required by the first testing station 31 and stores the testing mode numeral into the second storage module 12. The reading module 14 is used to read the set testing mode numerals from the second storage module 12. The loading module 15 loads the BIOS program 21 corresponding to the testing mode numeral read by the reading module 14 for use by the first testing station 31.

In a practical embodiment, the setting module 13, the reading module 14 and/or the loading module 15 are disposed on the motherboard 4. More particularly, the setting module 13, the reading module 14 and/or the loading module 15 can be integrated into a controlling chip, which is disposed on the motherboard 4 and capable of accessing the second storage module 12, that is storing/reading the set testing mode numerals into/from the second storage module 12. In the present embodiment, the controlling chip can be, for example, a baseboard management controller.

Figure 2:
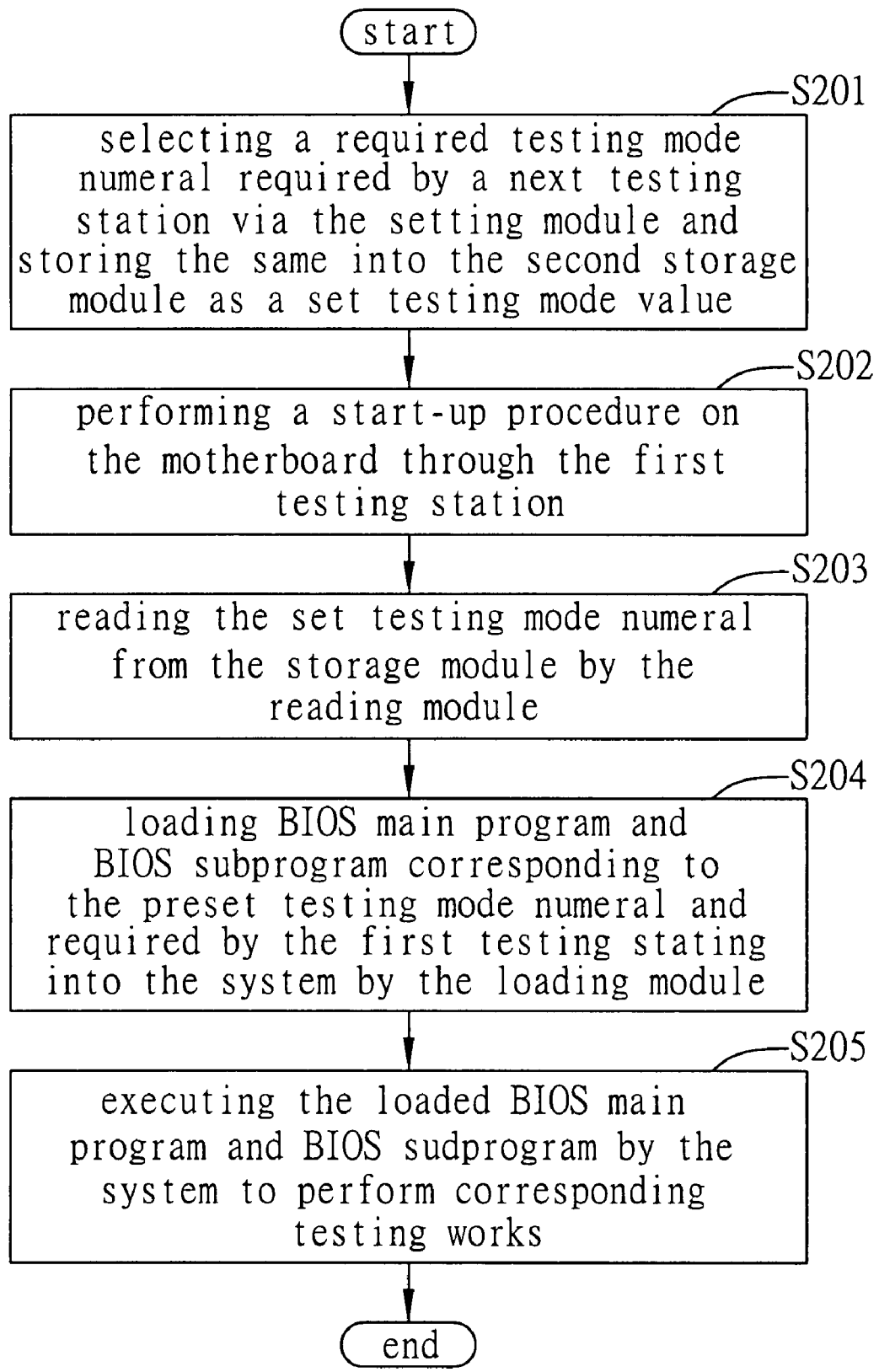
FIG. 2 is a flow chart of a method for setting motherboard testing procedures using the system shown in FIG. 1.

FIG. 2 shows a flow chart of a method for setting motherboard testing procedures using the system 1 of the present invention. As shown in FIG. 2, at step S201, the setting module 13 sets a required testing mode numeral corresponding to one of the BIOS programs, which required by a next testing station and stores the testing mode numeral in the second storage module 12 as a set testing mode numeral. Proceed to step S202.

At step S202, when the motherboard 4 arrives the first testing station 31 and a necessary mechanism and/or an electrical connection has been established between the motherboard 4 and the first testing station 31, the first testing station 31 performs a start-up procedure on the motherboard 4. Proceed to step S203.

At step S203, during the performance of start-up procedure, the reading module 14 reads the set testing mode numeral from the second storage module 12. In the present embodiment, the testing mode numeral is corresponding to the BIOS main program 21 and BIOS subprogram required by the first testing station 31. Proceed to step S204.

At step S204, the loading module is loads the BIOS main program 21 and the BIOS subprogram corresponding to the set testing mode numeral and required by the first testing station 31 into the system 1. Proceed to step S205.

At step S205, the system 1 executes the BIOS program 21 and the BIOS subprogram loaded into the system 1 by the loading module 15 so as to perform corresponding testing works.

Therefore, through relative operations between the storage modules, the setting module, the reading module and the loading module, the system and method for setting motherboard testing procedures according to the present invention can set different testing modes and testing options according to different testing stations, thereby improving the testing efficiency of the motherboard testing procedures having a plurality of testing stations.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A system for setting motherboard testing procedures which is applicable in a plurality of testing stations, the system comprising:

a first storage module stored with a plurality of BIOS programs respectively corresponding to the testing stations;

a second storage module stored with a plurality of testing mode numerals corresponding to the BIOS programs;

a setting module for setting a required testing mode numeral corresponding to one of the BIOS programs, which required by one of the testing stations and storing the required testing mode numeral into the second storage module;

a reading module for reading the testing mode numeral from the second storage module; and a loading module for loading one of the BIOS programs from the first storage module, which corresponding to the testing mode numeral stored in the second storage and read by the reading module.

2. The system of claim 1, wherein the first storage module and the second storage module are non-volatile memories disposed on a motherboard.

3. The system of claim 2, wherein the non-volatile memories are selected from the group consisting of EPROMs, EEPROMs and flash memories.

4. The system of claim 1, wherein the BIOS programs comprise BIOS main programs required by all of the testing stations and a variety of BIOS subprograms respectively required by the testing stations.

5. The system of claim 1, wherein at least two of the setting module, the reading module and the loading module are integrated into a controlling chip capable of accessing the second storage module.

6. A method for setting motherboard testing procedures, the method comprising the steps of:

setting a required testing mode numeral corresponding to one of a plurality of BIOS programs, which required by one of a plurality of testing stations via a setting module and storing the same into a second storage module as a set testing mode numeral;

performing a start-up procedure;

reading the set testing mode numeral from the second storage module by a reading module during the performance of the start-up procedure;

loading one of the BIOS programs corresponding to the testing mode numeral from a first storage module by a loading module; and executing the BIOS program so as to perform corresponding testing works.

* * * * *